US012124900B2

(12) United States Patent
Hoobler et al.

(10) Patent No.: US 12,124,900 B2
(45) Date of Patent: Oct. 22, 2024

(54) BARCODE-READING SYSTEM IN WHICH DECODING OCCURS ON A REMOTE SERVER

(71) Applicant: The Code Corporation, Murray, UT (US)

(72) Inventors: Ryan Wayne Hoobler, Cottonwood Heights, UT (US); Steven Ned Pierce, West Jordan, UT (US); Kirk F. Matheson, Bountiful, UT (US); Juihsiang Ray Shih, Shrewsbury, MA (US); Michael Aaron Eddards, West Valley City, UT (US); Skanda Kumar Srikanta, Lowell, MA (US); Brian Lampright, Huntsville, UT (US); Nimrod German Mendoza Paredes, Orem, UT (US); Denver Joseph Hoggatt, Bluffdale, UT (US)

(73) Assignee: THE CODE CORPORATION, Murray, UT (US)

(*) Notice: Subject to any disclaimer, the term of this patent is extended or adjusted under 35 U.S.C. 154(b) by 246 days.

(21) Appl. No.: 17/731,546

(22) Filed: Apr. 28, 2022

(65) Prior Publication Data
US 2023/0351137 A1   Nov. 2, 2023

(51) Int. Cl.
*G06K 17/00* (2006.01)
*G06K 7/10* (2006.01)
*G06K 7/14* (2006.01)

(52) U.S. Cl.
CPC ..... *G06K 17/0022* (2013.01); *G06K 7/10732* (2013.01); *G06K 7/10821* (2013.01); *G06K 7/1417* (2013.01)

(58) Field of Classification Search
CPC ........... G06K 17/0022; G06K 7/10732; G06K 7/10821; G06K 7/1417
See application file for complete search history.

(56) References Cited

U.S. PATENT DOCUMENTS

| 8,939,372 B2 | 1/2015 | Gu |
| 9,558,387 B2* | 1/2017 | Sweeney .......... G06K 19/06037 |
| 11,076,021 B2 | 7/2021 | Ashby et al. |

(Continued)

OTHER PUBLICATIONS https://online-barcode-reader.inliteresearch.com/.

*Primary Examiner* — Chico A Foxx
(74) *Attorney, Agent, or Firm* — Thomas M. Hardman (57) ABSTRACT

A barcode-reading device can send barcode images to a remote server for decoding. A decoder on the remote server can process the images and attempt to decode any barcodes in the images. Once the decoder on the remote server has successfully decoded a barcode, the remote server can send the decoded data back to the barcode-reading device and/or to a host computing device that is communicatively coupled to the barcode-reading device. If the barcode-reading device receives the decoded data, the barcode-reading device can forward the decoded data to the host computing device. In some embodiments, a barcode-reading device can send all captured images to the remote server. Alternatively, a barcode-reading device can send only some captured images to the remote server. In some embodiments, a barcode-reading device can be configured to perform one or more preliminary processing operations on an image before sending the image to the remote server.

15 Claims, 9 Drawing Sheets

(56) References Cited

U.S. PATENT DOCUMENTS

| | | | |
|---|---|---|---|
| 2003/0120555 A1* | 6/2003 | Kitagawa | G06Q 20/341 |
| | | | 705/26.1 |
| 2007/0084928 A1* | 4/2007 | Ackley | G06K 17/0022 |
| | | | 235/462.11 |
| 2010/0025470 A1* | 2/2010 | Nakagawa | G06K 7/14 |
| | | | 235/462.01 |
| 2010/0322464 A1* | 12/2010 | Beak | G06K 7/1447 |
| | | | 382/100 |
| 2010/0327066 A1* | 12/2010 | Khan | G06K 7/10722 |
| | | | 709/219 |
| 2011/0117940 A1* | 5/2011 | Pfaender | G06V 10/95 |
| | | | 455/466 |
| 2012/0023167 A1* | 1/2012 | Hovdal | H04M 3/56 |
| | | | 709/204 |
| 2012/0132701 A1* | 5/2012 | Nakagawa | G06Q 30/02 |
| | | | 235/375 |
| 2012/0205436 A1* | 8/2012 | Thomas | G06K 17/0025 |
| | | | 235/375 |
| 2013/0050743 A1 | 2/2013 | Steely et al. | |
| 2014/0027517 A1* | 1/2014 | Gu | G06K 7/146 |
| | | | 235/462.41 |
| 2015/0379315 A1* | 12/2015 | Pierce | G06K 7/0017 |
| | | | 235/462.15 |
| 2016/0188932 A1* | 6/2016 | Powell | H01M 50/247 |
| | | | 235/462.42 |
| 2016/0321485 A1* | 11/2016 | Utykanski | G06K 7/10831 |
| 2018/0047005 A1 | 2/2018 | Bilgen | |
| 2018/0181850 A1* | 6/2018 | Powell | G06K 7/10732 |
| 2021/0279436 A1* | 9/2021 | Barkan | G06K 7/10881 |

* cited by examiner

BARCODE-READING SYSTEM IN WHICH DECODING OCCURS ON A REMOTE SERVER

CROSS-REFERENCE TO RELATED APPLICATIONS

N/A

BACKGROUND

The present disclosure is generally related to barcodes and barcode-reading devices. The term "barcode" refers to an optical machine-readable representation of information. The term "barcode-reading device" refers to any device that is capable of identifying or extracting information from barcodes.

An image-based barcode-reading device includes a camera for capturing an image of a barcode to be read. The camera includes a focusing lens that focuses light reflected from a target area onto a photosensor array. Once an image of a barcode has been captured by the camera, a decoder processes the image and extracts the information contained in the barcode. An image-based barcode-reading device can be a standalone device (commonly referred to as a barcode reader or a barcode scanner), or an image-based barcode-reading device can be a mobile computing device (e.g., a smartphone or tablet computer) that includes a camera and software for reading barcodes.

Traditionally, the decoder is local to the barcode-reading device. In other words, once a camera in a barcode-reading device has captured an image of a barcode, a decoder located within the barcode-reading device itself decodes the barcode.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The present disclosure is generally related to techniques for remote decoding of barcodes. In accordance with one aspect of the present disclosure, a barcode-reading device can send images, including barcode images, to a remote server for processing. In other words, instead of a local decoder on the barcode-reading device attempting to decode the barcode images, the barcode-reading device can send the images to a remote server, and a decoder on the remote server can process the images and attempt to decode any barcodes in the images.

In some embodiments, the remote server can be located in the "cloud." In other words, the barcode-reading device can be communicatively coupled to the remote server via the Internet. Alternatively, the barcode-reading device can be communicatively coupled to the remote server via a network connection that does not include the Internet (e.g., a local area network).

Once the decoder on the remote server has successfully decoded a barcode, the remote server can send the decoded data back to the barcode-reading device and/or to a host computing device that is communicatively coupled to the barcode-reading device. If the decoded data is sent back to the barcode-reading device, the barcode-reading device can forward the decoded data to the host computing device. At the host computing device, the decoded data can be provided to an application that is expecting to receive the decoded data. In some embodiments, the remote server can send the decoded data directly to an application. The application may be located on the host computing device, or the application may be located on a different device that is communicatively coupled to the remote server. The decoded data can be sent to the application using one or more defined interfaces (e.g., one or more application programming interfaces (APIs)).

Many of the computing resources that are included in a conventional barcode reader are used for the purpose of decoding barcodes. Therefore, one benefit of the remote decoding techniques disclosed herein is that the barcode-reading device itself can be configured with fewer computing resources than a conventional barcode reader. In other words, a barcode-reading device that sends barcode images to a remote server for decoding does not need the amount of processing and memory resources that a conventional barcode reader needs to decode barcodes locally. This reduces the complexity, and therefore the cost, of such barcode-reading devices.

In some embodiments, a barcode-reading device can be configured to send all of the images that it captures to a remote server. Alternatively, a barcode-reading device can be configured to send only some captured images to a remote server.

In some embodiments, a barcode-reading device can be configured to perform one or more preliminary processing operations on an image before sending the image to the remote server. Some examples of preliminary processing operations include determining whether an image includes a barcode, determining whether an image has any contrast, cropping the image, etc. In some embodiments, the preliminary processing operation(s) that are performed on an image can affect whether or not the image is sent to the remote server. For example, if it is determined that an image does not include a barcode or does not include any contrast, the image can simply be discarded without sending the image to the remote server.

As noted above, in some embodiments the remote server can send the decoded data back to the barcode-reading device itself. In such embodiments, the barcode-reading device can forward the decoded data to a host computing device that is communicatively coupled to the barcode-reading device. For example, the barcode-reading device can include a wireless communication module that is configured to establish a wireless connection to the host computing device, and the decoded data can be sent to the host computing device via the wireless connection.

In some embodiments, the remote server can send the decoded data directly to a host computing device that is communicatively coupled to the barcode-reading device. For example, the remote server can include at least one data record that associates the barcode-reading device with the host computing device. When the remote server receives a barcode image from the barcode-reading device, the remote server can recognize, based at least in part on the data record(s), that the barcode-reading device is associated with the host computing device. The remote server can then send the decoded data corresponding to the barcode image directly to the host computing device.

In some embodiments, the remote server can be configured to evaluate the quality of the barcode images that are received from the barcode-reading device and send image quality feedback to the barcode-reading device. The barcode-reading device can be configured to change at least one image capture setting based at least in part on the image quality feedback.

In some embodiments, the barcode-reading device can be configured to monitor its surrounding environment and request image quality feedback when its surrounding environment changes. Such feedback can be requested even when the barcode-reading device is in an idle state and is not being used to read barcodes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
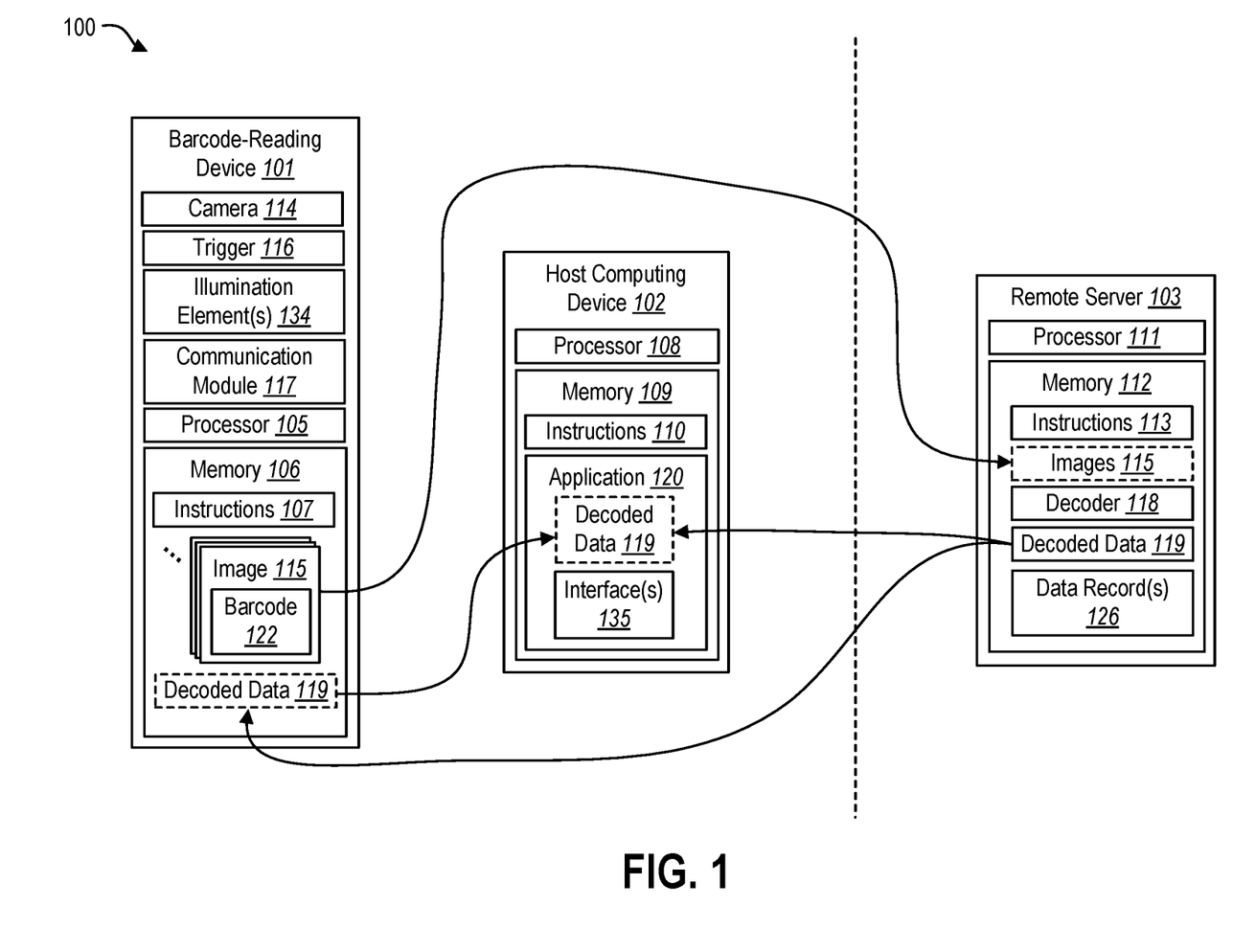
FIG. 1 illustrates an example of a barcode-reading system including a barcode-reading device that is communicatively coupled to a host computing device and to a remote server. The barcode-reading device is configured to send images, including barcode images, to the remote server for decoding and the remote server is configured to send decoded data to the barcode-reading device, the host computing device and/or an application that is expecting to receive the decoded data.

FIG. 1 illustrates an example of a barcode-reading system 100 in which the techniques disclosed herein can be utilized. The barcode-reading system 100 includes a barcode-reading device 101 that is communicatively coupled to a host computing device 102. In some embodiments, the barcode-reading device 101 and the host computing device 102 can be at the same physical location (e.g., within the same room). Communication between the barcode-reading device 101 and the host computing device 102 can occur via a wired connection or a wireless connection (e.g., a Bluetooth® or a WLAN connection).

The barcode-reading device 101 is also communicatively coupled to a remote server 103. The dotted line shown in FIG. 1 is intended to represent that the remote server 103 can be in a different physical location than the barcode-reading device 101 and the host computing device 102. However, in some embodiments, the barcode-reading device 101, the host computing device 102, and the remote server 103 can all be in the same physical location (e.g., within the same building).

In some embodiments, the remote server 103 can be located in the "cloud." In other words, communication between the barcode-reading device 101 and the remote server 103 can occur via the Internet. In some embodiments, the remote server 103 can be part of a cloud computing infrastructure that is maintained and operated by a cloud computing provider for the purpose of providing cloud computing services. Examples of such cloud computing services include Amazon Web Services (AWS) and Microsoft Azure. This type of cloud is commonly referred to as a public cloud. In other embodiments, the remote server 103 can be part of a private cloud.

For simplicity, only one remote server 103 is shown in FIG. 1. However, the functionality that is described herein in connection with the remote server 103 can be implemented using a plurality of different servers working together.

At least some of the functionality described herein in relation to the barcode-reading device 101, host computing device 102, and remote server 103 can be implemented via execution of instructions stored in memory by one or more processors. The barcode-reading device 101 is shown with a processor 105, memory 106 communicatively coupled to the processor 105, and instructions 107 stored in the memory 106. The host computing device 102 is shown with a processor 108, memory 109 communicatively coupled to the processor 108, and instructions 110 stored in the memory 109. The remote server 103 is shown with a processor 111, memory 112 communicatively coupled to the processor 111, and instructions 113 stored in the memory 112.

The barcode-reading device 101 includes a camera 114 that is configured to capture images 115. The camera 114 can be a digital camera, and the images 115 can be digital images.

The camera 114 can include an optical assembly including one or more lenses. The camera 114 can also include an image sensor (or imager). The image sensor can be a solid-state device that is configured to detect and convey information used to make an image. The image sensor can include a relatively large number of light-sensitive pixels that are arranged in horizontal rows and vertical columns. The image sensor can be a charge-coupled display (CCD) image sensor, a complementary metal-oxide-semiconductor (CMOS) image sensor, or another type of image sensor.

The lens(es) within the optical assembly can be configured to receive light reflected from objects within the field of view of the camera 114 and focus this reflected light onto the image sensor. The camera 114 can also include read-out circuitry that is configured to electronically read the pixels within the image sensor to provide an image (i.e., a two-dimensional array of image data).

The barcode-reading device 101 also includes a trigger 116. The trigger 116 can be a device or mechanism that is capable of being activated by a user of the barcode-reading device 101 to initiate barcode reading. The barcode-reading device 101 can include circuitry that is configured to detect the activation of the trigger 116. This circuitry can also be configured to cause the camera 114 to begin capturing images 115 in response to detecting the activation of the trigger 116.

There are many different kinds of devices or mechanisms that can be used as the trigger 116. As one example, the trigger 116 can be a device that is capable of being pressed or moved in some fashion (e.g., a lever, a button), and the trigger 116 can be activated by pressing or moving the trigger 116.

Although the barcode-reading device 101 shown in FIG. 1 includes a trigger 116, the barcode-reading device 101 can be capable of operating in a mode in which the barcode-reading device 101 captures images 115 even when the trigger 116 is not activated. Such a mode may be referred to as a "continuous capture" or "continuous reading" mode. In some alternative embodiments, a barcode-reading device that implements the techniques disclosed herein may not include a trigger.

The barcode-reading device 101 includes one or more illumination elements 134. The illumination elements 134 are configured to illuminate the field of view of the camera 114. The barcode-reading device 101 can be configured so that the illumination element(s) 134 are illuminated in response to activation of the trigger 116. The barcode-reading device 101 can be configured so that the illumination element(s) 134 are (i) normally not illuminated (i.e., turned off), and (ii) illuminated (i.e., turned on) when the barcode-reading device 101 is being used to read barcodes 122 and the camera 114 is capturing images 115 for that purpose.

The barcode-reading device 101 also includes a communication module 117. The communication module 117 facilitates communication with the host computing device 102 and also with the remote server 103. In some embodiments, the communication module 117 can include a plurality of sub-modules. For example, the communication module 117 can include a first sub-module that facilitates communication with the host computing device 102 and a second sub-module that facilitates communication with the remote server 103.

Unlike a conventional barcode-reading device, the barcode-reading device 101 in the depicted system 100 does not include a decoder. Instead of being located on the barcode-reading device 101, the decoder 118 is located on the remote server 103. Thus, the barcode-reading device 101 can be configured to send some or all of the images 115 captured by the camera 114 to the remote server 103 for decoding.

The decoder 118 can include instructions that are stored in memory 112 and executable by the processor 111 to perform the functionality that is described herein in relation to the decoder 118.

The decoder 118 processes the images 115 that the remote server 103 receives from the barcode-reading device 101 and attempts to decode any barcodes 122 in the images 115. When the decoder 118 is able to successfully decode a barcode 122 in an image 115, the remote server 103 sends the corresponding decoded data 119 back to the barcode-reading device 101 and/or to the host computing device 102. If the decoded data 119 is sent back to the barcode-reading device 101, the barcode-reading device 101 can forward the decoded data 119 to the host computing device 102. At the host computing device 102, the decoded data 119 can be provided to an application 120 that is expecting to receive the decoded data 119.

In some embodiments, the remote server 103 can send the decoded data 119 to an entity other than the application 120 on the host computing device 102, and that entity can then deliver the decoded data 119 to the application 120. Alternatively, the remote server 103 can send the decoded data 119 directly to the application 120 using one or more defined interfaces 135. The interface(s) 135 can include one or more or application programming interfaces (APIs) that are exposed by the application 120.

In FIG. 1, the application 120 that receives the decoded data 119 is shown on the host computing device 102. Alternatively, the application 120 could be located elsewhere. For example, the application 120 could be located on a different computing device (or combination of computing devices) that is/are communicatively coupled to the remote server 103.

In embodiments where the remote server 103 sends the decoded data 119 to the host computing device 102, the remote server 103 includes at least one data record 126 that associates the barcode-reading device 101 with the host computing device 102. In response to receiving an image 115 from the barcode-reading device 101, the remote server 103 can determine, based at least in part on the data record(s) 126, that the barcode-reading device 101 is associated with the host computing device 102. When the decoder 118 is able to successfully decode a barcode 122 in the image 115, the remote server 103 uses the information contained in the data record(s) 126 to send the decoded data 119 back to the host computing device 102.

As noted above, one benefit of the remote decoding techniques disclosed herein is that the barcode-reading device 101 can be configured with fewer computing resources than a conventional barcode reader. In other words, the barcode-reading device 101 can be a relatively inexpensive device that does not include as many processing and memory resources as a conventional barcode reader. Thus, the barcode-reading device 101 can be a much simpler and less expensive device than a conventional barcode reader.

Figure 2:
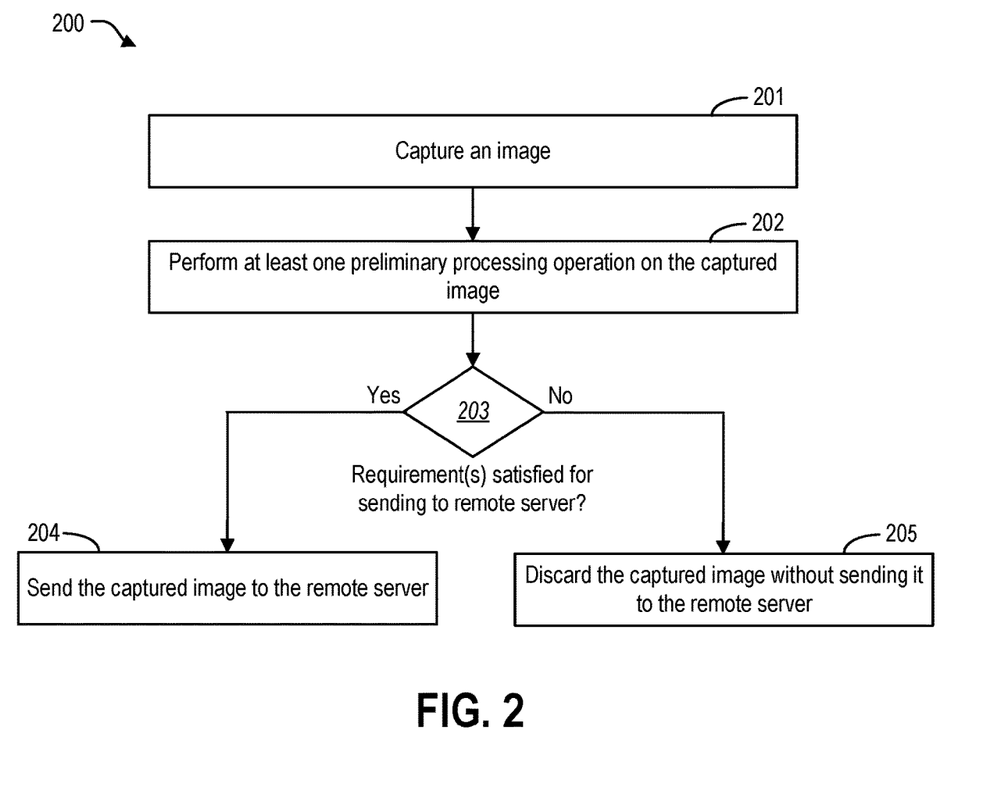
FIG. 2 illustrates an example showing how the barcode-reading device in FIG. 1 can perform one or more preliminary processing operations on an image before sending the image to the remote server.

As noted above, in some embodiments the barcode-reading device 101 can be configured to perform one or more preliminary processing operations on an image 115 before sending the image 115 to the remote server 103. FIG. 2 illustrates an example of a method 200 showing how this can occur.

At 201, the camera 114 in the barcode-reading device 101 captures an image 115. At 202, the barcode-reading device 101 performs at least one preliminary processing operation on the captured image 115. Some examples of preliminary processing operations that can be performed will be described below.

At 203 a determination is made, based on the results of the preliminary processing operation(s) performed at 202, whether at least one requirement has been satisfied for sending the captured image 115 to the remote server 103. If at 203 the determination is made that the requirement(s) have been satisfied, then at 204 the barcode-reading device 101 can send the captured image 115 to the remote server 103. On the other hand, if at 203 the determination is made that the requirement(s) have not been satisfied, then at 205 the barcode-reading device 101 can discard the captured image 115 without sending it to the remote server 103.

There are many different types of preliminary processing operations that can be performed on a captured image 115. There are also many different types of requirements that can be established for determining whether a captured image 115 should be sent to the remote server 103. Some examples will now be described.

In one example, a barcode-reading device 101 can determine whether the captured image 115 includes a barcode 122. If it is determined that the captured image 115 includes a barcode 122, then the captured image 115 can be sent to the remote server 103 for decoding. On the other hand, if it is determined that the captured image 115 does not include a barcode 122, then the captured image 115 can be discarded without sending the captured image 115 to the remote server 103.

In the example just described, the preliminary processing operation (corresponding to 202 in the method 200) is determining whether the captured image 115 includes a barcode. The requirement (corresponding to 203 in the method 200) for sending the captured image 115 to the remote server 103 is that the captured image 115 must include a barcode.

In another example, a barcode-reading device 101 can determine whether the captured image 115 includes any contrast. In other words, a barcode-reading device 101 can determine whether the captured image 115 is an all-white image or an all-black image. If it is determined that the captured image 115 includes at least some contrast (i.e., that the captured image 115 is not an all-white image or an all-black image), then the captured image 115 can be sent to the remote server 103 for decoding. On the other hand, if it is determined that the captured image 115 does not include any contrast (i.e., that the captured image 115 is an all-white image or an all-black image), then the captured image 115 can be discarded without sending the captured image 115 to the remote server 103.

In the example just described, the preliminary processing operation (corresponding to 202 in the method 200) is determining whether the captured image 115 includes any contrast. The requirement (corresponding to 203 in the method 200) for sending the captured image 115 to the remote server 103 is that the captured image 115 must include at least some contrast (i.e., must not be an all-white image or an all-black image).

Another example of a preliminary processing operation that can be performed by a barcode-reading device 101 involves cropping an image 101. For example, a barcode-reading device 101 can be configured to identify a region of an image 115 where a barcode is located and then crop the image 115. The barcode-reading device 101 can send the cropped image to the remote server 103 instead of sending the entire image 115.

Figure 3:
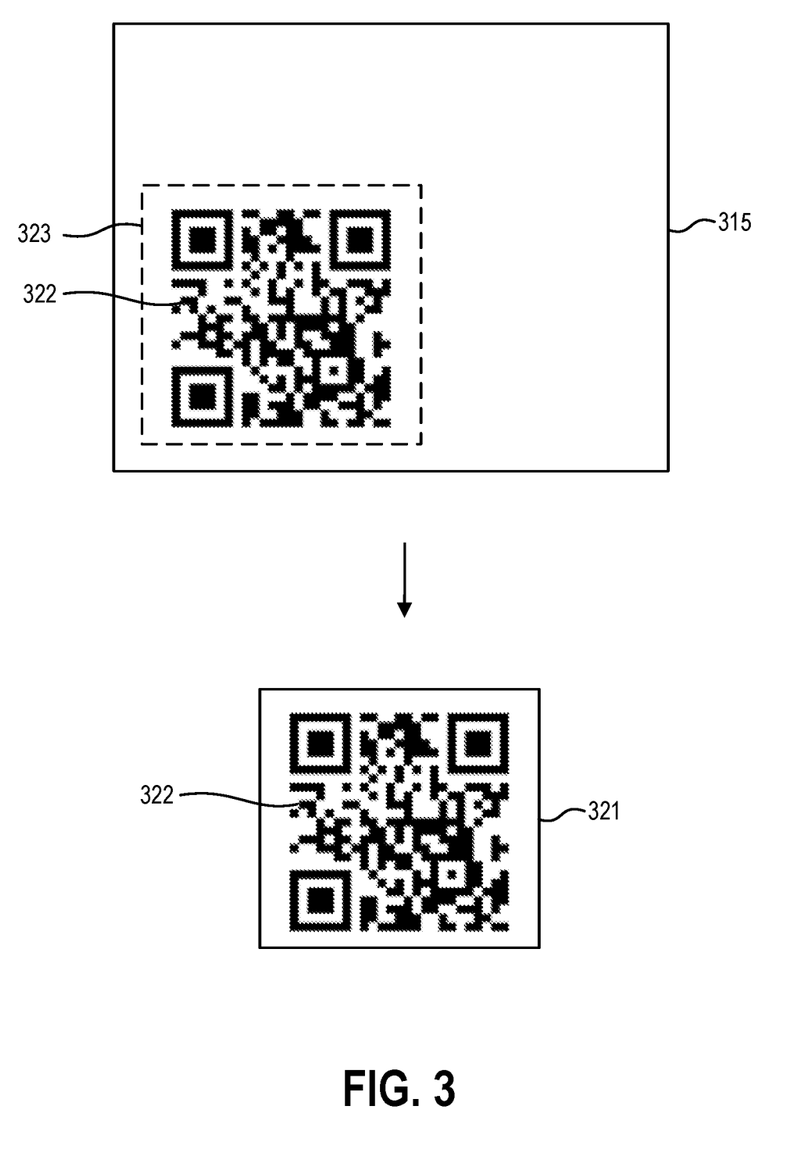
FIG. 3 illustrates an example of an image and a cropped image.

FIG. 3 illustrates an example of an image 315 and a cropped image 321. The image 315 is an example of an image 115 that can be captured by the camera 114 of the barcode-reading device 101. The cropped image 321 is a cropped version of the image 315. Both the image 315 and the cropped image 321 will be described in greater detail in connection with FIG. 4, which illustrates a method 400 showing how the image 315 can be processed by the barcode-reading device 101.

Figure 4:
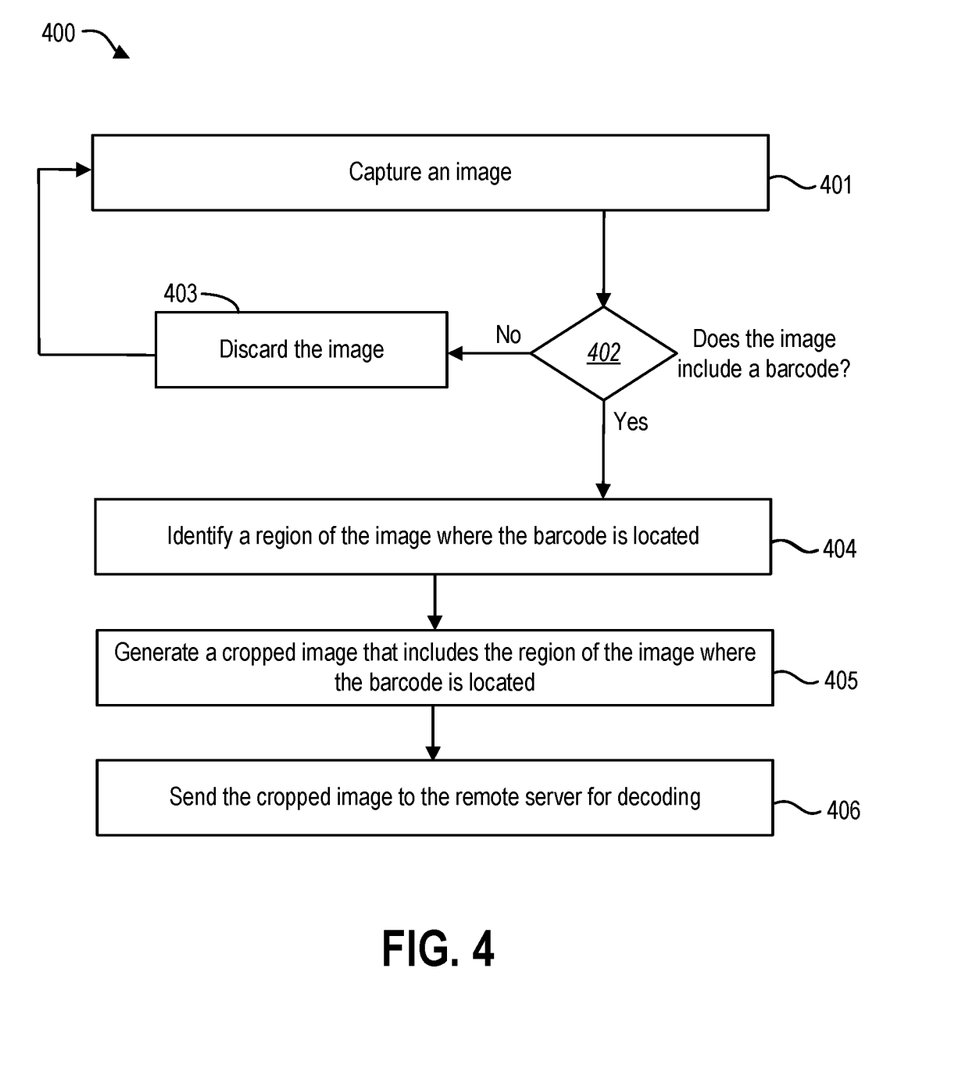
FIG. 4 illustrates an example showing how the image in FIG. 3 can be processed by the barcode-reading device in FIG. 1.

At 401, the camera 114 in the barcode-reading device 101 captures an image 315. At 402, the barcode-reading device 101 determines whether the image 315 includes a barcode 322. If at 402 a determination is made that the image 315 does not include a barcode 322, then at 403 the barcode-reading device 101 discards the image 315 without sending the image 315 to the remote server 103. Then the method 400 returns to 401 and the barcode-reading device 101 captures another image 315.

On the other hand, if at 402 a determination is made that the image 315 does include a barcode 322, then at 404 the barcode-reading device 101 identifies a region 323 of the image 315 where the barcode 322 is located. Then, at 405, the barcode-reading device 101 generates a cropped image 321 that includes that region 323. At 406, the barcode-reading device 101 sends the cropped image 321 to the remote server 103 for decoding.

In the method 400 shown in FIG. 4, a plurality of different preliminary processing operations are performed by the barcode-reading device 101. More specifically, determining whether the image 315 includes a barcode 322 (at 402), identifying a region 323 of the image 315 where the barcode 322 is located (at 404), and generating a cropped image 321 (at 405) are each preliminary processing operations that are performed by the barcode-reading device 101 in this method 400.

Figure 5:
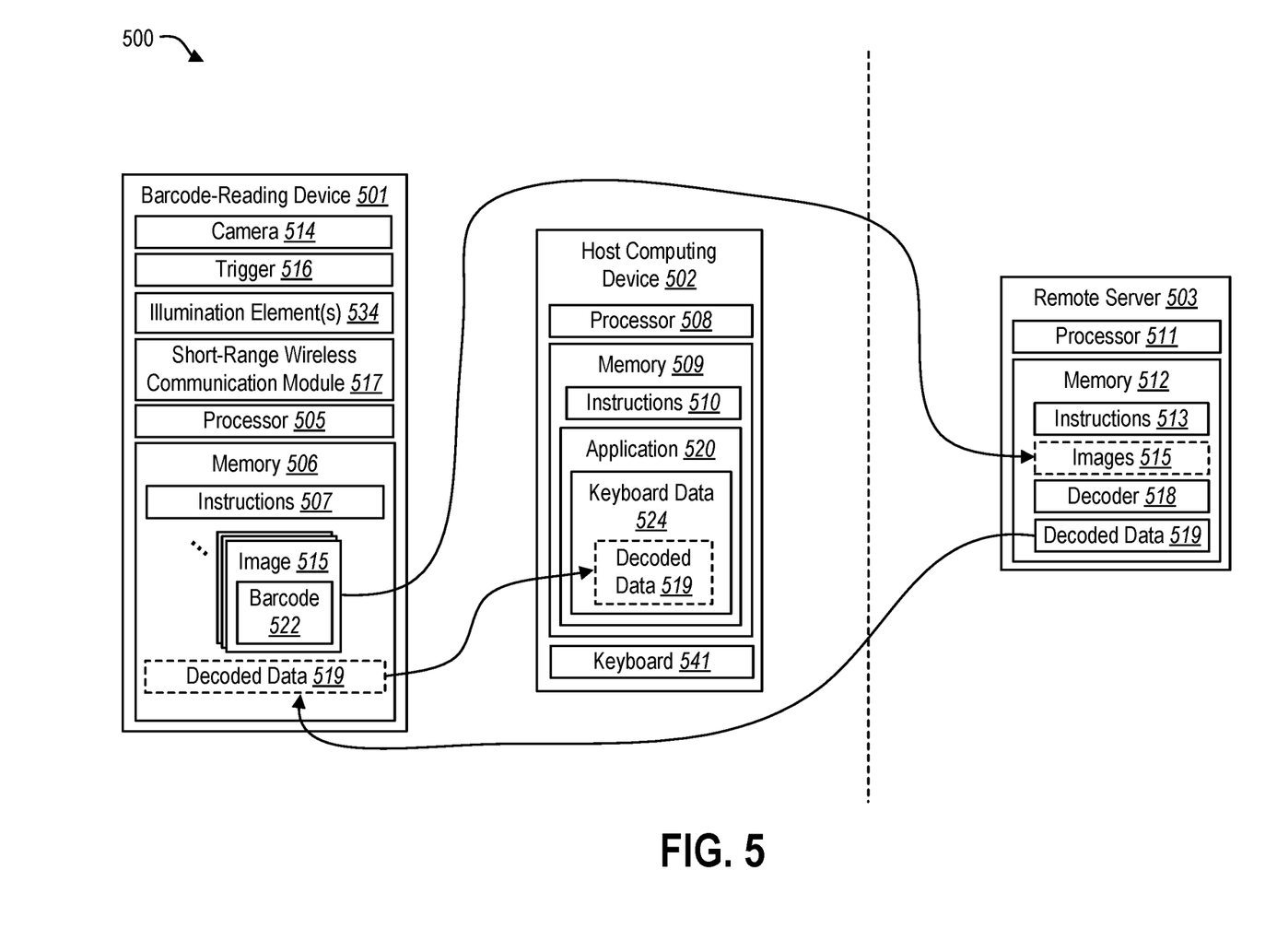
FIG. 5 illustrates an example of a barcode-reading system in which the barcode-reading device includes a short-range wireless communication module.

FIG. 5 illustrates another example of a barcode-reading system 500 in which the techniques disclosed herein can be utilized. The barcode-reading system 500 shown in FIG. 5 is similar to the barcode-reading system 100 that was previously described in connection with FIG. 1, except as indicated below.

In the barcode-reading device 501 shown in FIG. 5, the communication module is a wireless communication module that is configured to establish a wireless connection to the host computing device 502. More specifically, the wireless communication module is a short-range wireless communication module 517 that is configured to establish a short-range wireless connection to the host computing device 502. The barcode-reading device 501 can be configured to appear as a keyboard device to the host computing device 502 via the short-range wireless connection.

The short-range wireless communication module 517 can be configured to operate in accordance with any short-range wireless communication protocol that is capable of performing the functionality described herein. Some examples of short-range wireless communication protocols include Bluetooth® and Zigbee®. Of course, these specific examples should not be interpreted as limiting the scope of the present disclosure. Other short-range wireless communication protocols besides those specifically named herein may be used in accordance with the present disclosure.

When the decoder 518 is able to successfully decode a barcode in an image 515, the remote server 503 sends the corresponding decoded data 519 back to the barcode-reading device 501. The barcode-reading device 501 receives the decoded data 519 from the remote server 503 and sends the decoded data 519 to the host computing device 502 via the short-range wireless connection. In some embodiments, the barcode-reading device 501 sends the decoded data 519 as keyboard data 524 to an application 520 on the host computing device 502 via the short-range wireless connection. The keyboard data 524 can appear to the application 520 as keystrokes being typed on a keyboard 541 of the host computing device 502.

Figure 6:
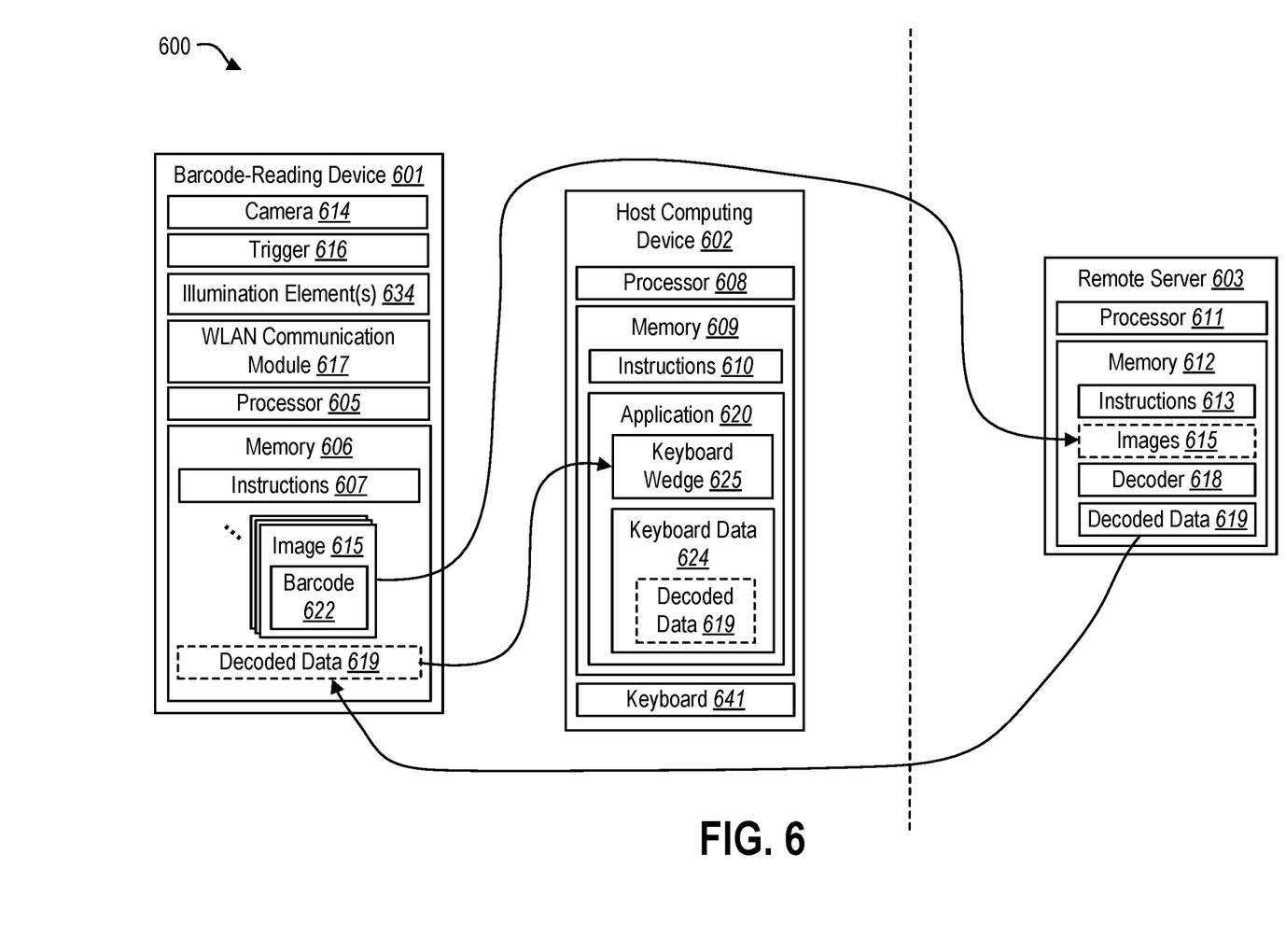
FIG. 6 illustrates an example of a barcode-reading system in which the barcode-reading device includes a wireless local area network (WLAN) module.

FIG. 6 illustrates another example of a barcode-reading system 600 in which the techniques disclosed herein can be utilized. The barcode-reading system 600 shown in FIG. 6 is similar to the barcode-reading system 500 that was previously described in connection with FIG. 5, except as indicated below.

In the barcode-reading device 601 shown in FIG. 6, the wireless communication module is a wireless local area network (WLAN) communication module 617 that is configured to establish a WLAN connection to the host computing device 602. When the barcode-reading device 601 receives the decoded data 619 from the remote server 603, the barcode-reading device 601 sends the decoded data 619 to the host computing device 602 via the WLAN connection.

In the depicted embodiment, the barcode-reading system 600 includes a keyboard wedge 625. The keyboard wedge 625 is configured to translate the decoded data 619 from the barcode-reading device 601 into keyboard data 624 and provide the keyboard data 624 to the application 620. In other words, the keyboard wedge 625 causes the application 620 to interpret the decoded data 619 coming from the barcode-reading device 601 as if it were keyboard data 624 (i.e., keystrokes being typed on a keyboard 641 of the host computing device 602).

The keyboard wedge 625 can be implemented in software and/or hardware. If implemented in software, the keyboard wedge 625 can include instructions that are stored in the memory 609 and executable by the processor 608 to perform the functions described herein in relation to the keyboard wedge 625. If implemented in software, the keyboard wedge 625 can be part of the application 620 (as shown in FIG. 6), or the keyboard wedge 625 can be separate from the application 620. If implemented in hardware, the keyboard wedge 625 can include a device that physically or logically "wedges" between the keyboard 641 of the host computing device 602 and the processor 608.

The keyboard wedge 625 is shown in FIG. 6 for purposes of example only, and it should not be interpreted as limiting the scope of the present disclosure. A barcode-reading device can send decoded data to a host computing device without the use of a keyboard wedge (as in other examples described herein).

Figure 7:
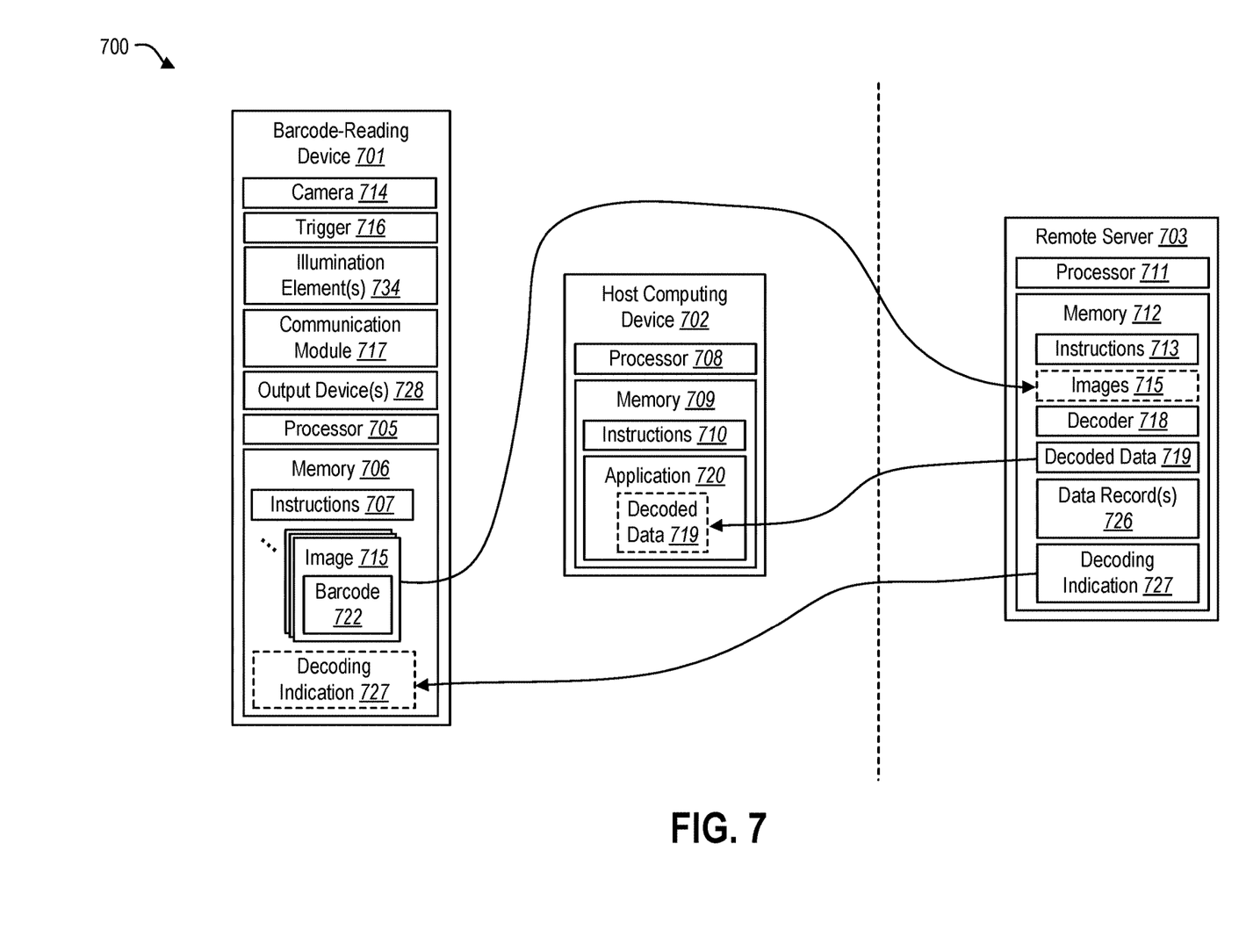
FIG. 7 illustrates an example of a barcode-reading system in which the remote server sends decoded data to a host computing device that is communicatively coupled to a barcode-reading device.

FIG. 7 illustrates another example of a barcode-reading system 700 in which the techniques disclosed herein can be utilized. The barcode-reading system 700 is similar to the barcode-reading system 100 that was previously described in connection with FIG. 1, except as indicated below.

The remote server 703 includes at least one data record 726 that associates the barcode-reading device 701 with the host computing device 702. In response to receiving an image 715 from the barcode-reading device 701, the remote server 703 determines, based at least in part on the data record(s) 726, that the barcode-reading device 701 is associated with the host computing device 702.

In response to making this determination, the remote server 703 sends the decoded data 719 to the host computing device 702. In some embodiments, the decoded data 719 can be provided to an application 720 running on the host computing device 702.

In some embodiments, in addition to sending the decoded data 719 to the host computing device 702, the remote server 703 also sends a decoding indication 727 to the barcode-reading device 701. The remote server 703 can send the decoding indication 727 to the barcode-reading device 701 in parallel to sending the decoded data 719 to the host computing device 702. In other words, the remote server 703 can send the decoding indication 727 to the barcode-reading device 701 at substantially the same time as it sends the decoded data 719 to the host computing device 702.

The barcode-reading device 701 can be configured to generate a visual output, an audible output, and/or tactile feedback in response to receiving the decoding indication 727. One benefit of generating this type of output and/or feedback is that it has the effect of notifying the user of the barcode-reading device 701 that the barcode 722 has been decoded. The visual output, audible output, and/or tactile feedback can be generated via one or more output devices 728 on the barcode-reading device 701.

Figure 8:
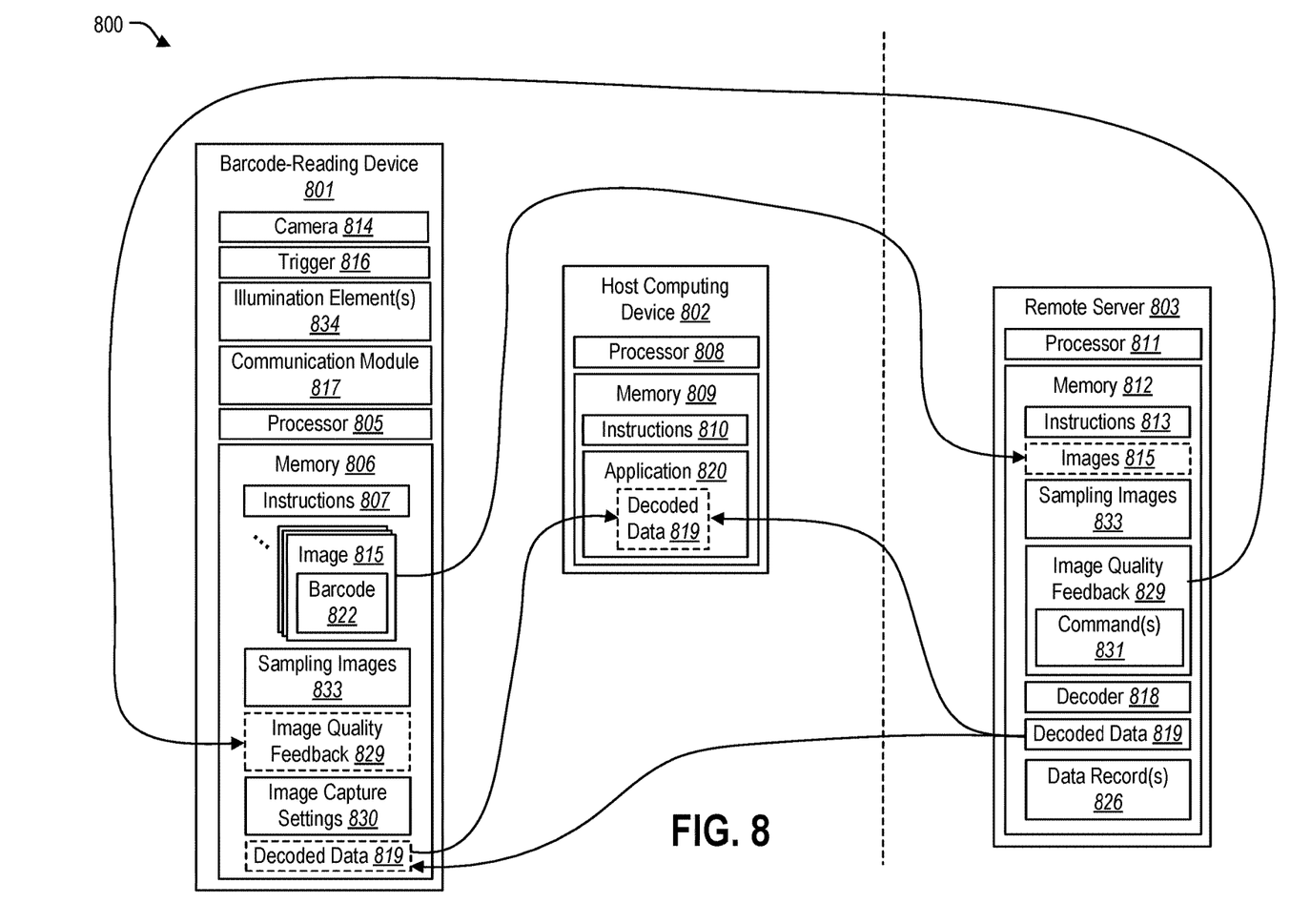
FIG. 8 illustrates an example of a barcode-reading system in which the remote server sends image quality feedback to the barcode-reading device and the barcode-reading device adjusts one or more image capture settings based on the image quality feedback.

FIG. 8 illustrates another example of a barcode-reading system 800 in which the techniques disclosed herein can be utilized. The barcode-reading system 800 is similar to the barcode-reading system 100 in FIG. 1, except as indicated below.

The remote server 803 shown in FIG. 8 is configured to send image quality feedback 829 back to the barcode-reading device 801 under some circumstances. The image quality feedback 829 can be based on an analysis of the quality of the images 815 that are received from the barcode-reading device 801. Thus, the remote server 803 can receive one or more images 815 from the barcode-reading device 801, analyze the image(s) 815, generate image quality feedback 829 based on the results of this analysis, and send the image quality feedback 829 to the barcode-reading device 801. The barcode-reading device 801 can change one or more image capture settings 830 in response to receiving the image quality feedback 829.

In some embodiments, the image quality feedback 829 can include one or more commands 831 to change one or more image capture settings 830. Alternatively, in other embodiments, the image quality feedback 829 can include other kinds of information (but not necessarily specific commands) that can cause the barcode-reading device 801 to change the image capture settings 830.

The image capture settings 830 can be related to, and affect the operation of, the image sensor in the camera 814. Some examples of image capture settings 830 include a gain setting and an exposure setting.

The gain setting controls the amplification of the signals from the image sensor in the camera 814. This amplification can take place before or after the analog-to-digital converter (ADC). The camera can include automatic gain control (AGC) circuitry that automatically determines what the gain setting should be. Under some circumstances, the AGC circuitry can be disabled and the gain setting can be manually changed based on the image quality feedback 829 received from the remote server 803.

The exposure setting controls the exposure interval of the image sensor in the camera 814. The exposure interval is the period of time during which photoelectrons accumulate on pixels in the image sensor. The exposure time can be controlled by a shutter, which can be an electronic shutter or a mechanical shutter. Electronic shuttering can be rolling or global. In the case of a rolling shutter, the exposure interval of each row immediately precedes that row's readout, in a process that "rolls" across the image frame. In the case of a global shutter, the exposure interval is the same for all of the pixels in the image sensor. Under some circumstances, the exposure interval can be changed (e.g., increased or decreased) based on the image quality feedback 829 received from the remote server 803.

The images 815 can be captured by the camera 814 when the barcode-reading device 801 is being used to read barcodes 822. In addition to capturing these images 815, the camera 814 can also sometimes capture sampling images 833. The sampling images 833 can be captured for the purpose of determining information about the surrounding environment.

In some embodiments, sampling images 833 can be captured periodically when the barcode-reading device 801 is not being used to read barcodes (e.g., when the trigger 816 is not activated).

The barcode-reading device 801 can be configured so that the illumination element(s) 834 are (i) normally not illuminated, and (ii) illuminated when the barcode-reading device 801 is being used to read barcodes 822 and the camera 814 is capturing images 815 for that purpose. However, in some embodiments, the illumination element(s) 834 of the barcode-reading device 801 can remain not illuminated (i.e., turned off, or deactivated) when the sampling images 833 are captured. In other words, the barcode-reading device 801 can be configured so that the illumination element(s) 834 are not turned on when the sampling images 833 are captured.

The barcode-reading device 801 can send sampling images 833 to the remote server 803 for the purpose of receiving image quality feedback 829 from the remote server 803. In some embodiments, all of the sampling images 833 that are captured by the camera 814 of the barcode-reading device 801 can be sent to the remote server 803 for the purpose of requesting image quality feedback 829. Alternatively, in other embodiments, only some of the sampling images 833 are sent to the remote server 803 for the purpose of requesting image quality feedback 829. For example, in some embodiments, the barcode-reading device 801 can send one or more sampling images 833 to the remote server 803 when the barcode-reading device 801 detects, based on analyzing the sampling images 833, that its surrounding environment has changed by a sufficient amount relative to a previous point in time.

One benefit of requesting such image quality feedback 829 is to enable the image capture settings 830 to be adjusted based on changes to the surrounding environment. Ideally, the image capture settings 830 should be optimally adjusted to the surrounding environment when the user picks up the barcode-reading device 801 and begins to use it for reading barcodes 822. This should enable decodable images 815 (i.e., images 815 that are of sufficiently high quality so that any barcodes in the images 815 are capable of being decoded) to be captured more quickly, which should enable decoding to occur more quickly.

As in embodiments discussed previously, the decoder 818 processes the images 815 that the remote server 803 receives from the barcode-reading device 801 and attempts to decode any barcodes 822 in the images 815. When the decoder 818 is able to successfully decode a barcode 822 in an image 815, the remote server 803 sends the corresponding decoded data 819 back to the barcode-reading device 801 and/or to the host computing device 802. If the decoded data 819 is sent back to the barcode-reading device 801, the barcode-reading device 801 can forward the decoded data 819 to the host computing device 802. At the host computing device 802, the decoded data 819 can be provided to an application 820 that is expecting to receive the decoded data 819.

In embodiments where the remote server 803 sends the decoded data 819 to the host computing device 802, the remote server 803 includes at least one data record 826 that associates the barcode-reading device 801 with the host computing device 802. In response to receiving an image 815 from the barcode-reading device 801, the remote server 803 can determine, based at least in part on the data record(s) 826, that the barcode-reading device 801 is associated with the host computing device 802. When the decoder 818 is able to successfully decode a barcode 822 in the image 815, the remote server 803 uses the information contained in the data record(s) 826 to send the decoded data 819 back to the host computing device 802.

Figure 9:
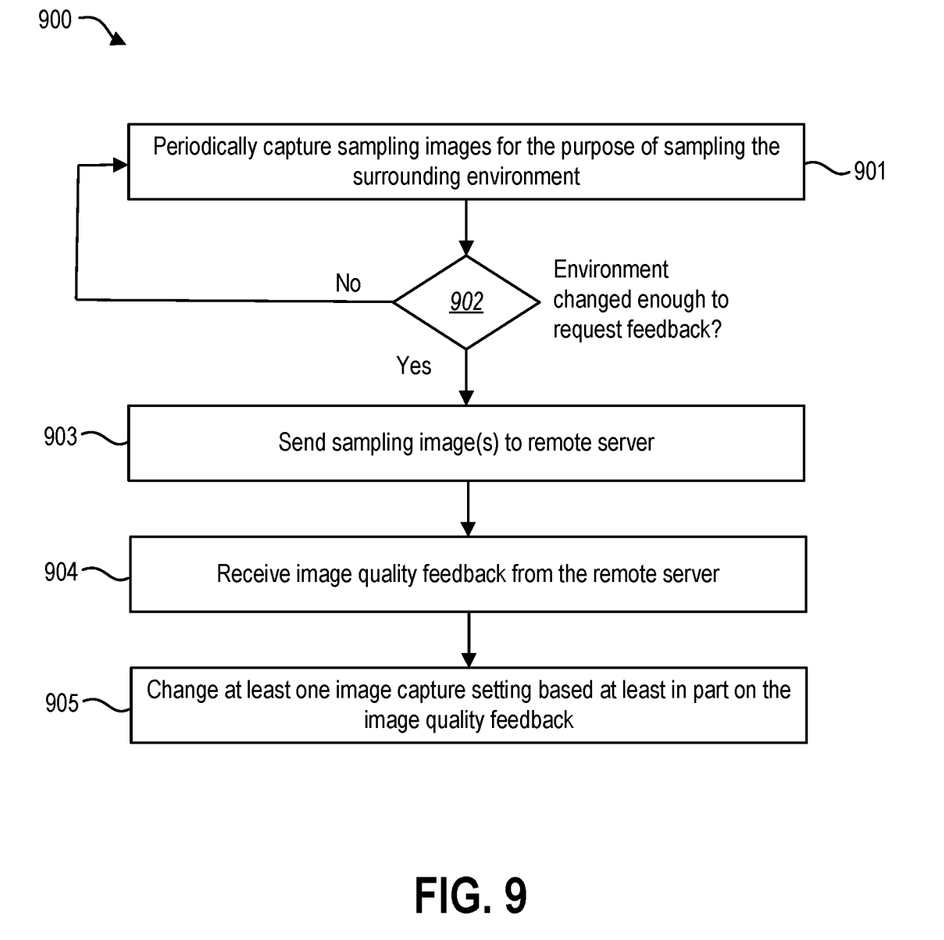
FIG. 9 illustrates an example of a method that can be performed by the barcode-reading device in FIG. 8 to request image quality feedback from the remote server.

FIG. 9 illustrates an example of a method 900 that can be performed by the barcode-reading device 801 to request image quality feedback 829 from the remote server 803.

At 901, the barcode-reading device 801 periodically captures sampling images 833 for the purpose of sampling the surrounding environment. At 902, the barcode-reading device 801 determines, based on analyzing the sampling images 833, whether the surrounding environment has changed by a sufficient amount to justify requesting image quality feedback 829 from the remote server 803.

In some embodiments, determining whether the surrounding environment has changed by a sufficient amount to justify requesting image quality feedback 829 from the remote server 803 can include comparing the two most recently captured sampling images 833. More specifically, a determination can be made about whether the current sampling image 833 (i.e., the most recently captured sampling image 833) differs from the previous sampling image 833 (i.e., the sampling image 833 that was captured just prior to the current sampling image 833) by more than a pre-defined amount. This pre-defined amount can be defined so that image quality feedback 829 is only requested when the surrounding environment of the barcode-reading device 801 changes to a significant extent.

If the two most recently captured sampling images 833 differ from one another by less than the pre-defined amount (e.g., they are substantially identical to one another), then the determination made at 902 can be that the surrounding environment has not changed enough to justify requesting image quality feedback 829. On the other hand, if the two most recently captured sampling images 833 differ from one another by more than the pre-defined amount (e.g., they are radically different from one another), then the determination made at 902 can be that the surrounding environment has changed enough to justify requesting image quality feedback 829.

If at 902 a determination is made that the surrounding environment has not changed enough to justify requesting image quality feedback 829, then the method 900 returns to 901 and the barcode-reading device 801 continues periodically capturing sampling images 833 for the purpose of sampling the surrounding environment.

However, if at 902 a determination is made that the surrounding environment has changed enough to justify requesting image quality feedback 829, then at 903 the barcode-reading device 801 sends one or more sampling images 833 to the remote server 803 for the purpose of requesting image quality feedback 829 from the remote server 803.

At 904, the barcode-reading device 801 receives image quality feedback 829 from the remote server 803 in response to sending the sampling image(s) 833 to the remote server 803. At 905, the barcode-reading device 801 changes at least one image capture setting 830 based at least in part on the image quality feedback 829.

As discussed above, at least some aspects of the present disclosure are related to cloud computing. Cloud computing is the delivery of computing services over the Internet. Some examples of computing services that can be provided by a cloud computing system include storage, databases, networking, software, and analytics.

Broadly speaking, a cloud computing system includes two sections, a front end and a back end, that are in communication with one another via the Internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

If any component shown in any of the figures has the same name as a component described in a previous figure, it can be assumed that the component has similar characteristics and functionality as the previously described component, unless indicated otherwise. For example, it can be assumed that the camera 514 shown in FIG. 5 has similar characteristics and functionality as the camera 114 shown in FIG. 1, unless indicated otherwise.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode-reading system, comprising:
   a barcode-reading device comprising:
      a communication module that is configured to communicatively couple the barcode-reading device to a host computing device and communicatively couple the barcode-reading device to a remote server;
      a camera that is configured to capture images;
      a barcode-reading device processor;
      barcode-reading device memory communicatively coupled to the barcode-reading device processor; and
      barcode-reading device instructions stored in the barcode-reading device memory and executable by the barcode-reading device processor to:
         cause the images to be sent to the remote server for decoding;
         perform at least one preliminary processing operation on an image that is captured by the camera, wherein the at least one preliminary processing operation comprises at least one of determining whether the image comprises a barcode or determining whether the image comprises any contrast;
         determine, based at least in part on results of the at least one processing operation, whether at least one requirement has been satisfied for sending the image to the remote server;
         send the image to the remote server when the at least one requirement is satisfied; and
         discard the image without sending the image to the remote server when the at least one requirement is not satisfied, wherein the barcode-reading device discards the image without sending the image to the remote server when at least one of the following conditions is satisfied: the barcode-reading device determines that the image does not comprise a barcode, or the barcode-reading device determines that the image does not comprise any contrast;
   a decoder on the remote server, wherein the decoder is executable by a remote server processor to process the images and attempt to decode any barcodes in the images; and
   remote server instructions that are executable by the remote server processor to cause decoded data to be sent back to at least one of the host computing device or the barcode-reading device.

2. The barcode-reading system of claim 1, wherein the barcode-reading device instructions are additionally executable by the barcode-reading device processor to:
   identify a region of an image where a barcode is located;
   generate a cropped image that comprises the region of the image where the barcode is located; and
   send the cropped image to the remote server.

3. The barcode-reading system of claim 1, wherein:
   the communication module comprises a wireless communication module that is configured to establish a wireless connection to the host computing device; and
   the barcode-reading device instructions are additionally executable by the barcode-reading device processor to receive the decoded data from the remote server and send the decoded data to the host computing device via the wireless connection.

4. The barcode-reading system of claim 3, wherein:
   the wireless communication module comprises a short-range wireless communication module;
   the short-range wireless communication module is configured to establish a short-range wireless connection to the host computing device;
   the barcode-reading device appears as a keyboard device to the host computing device via the short-range wireless connection; and
   the barcode-reading device instructions are additionally executable by the barcode-reading device processor to send the decoded data as keyboard data to an application on the host computing device via the short-range wireless connection.

5. The barcode-reading system of claim 3, wherein:
   the wireless communication module comprises a wireless local area network (WLAN) communication module;
   the WLAN communication module is configured to establish a WLAN connection to the host computing device; and
   the barcode-reading device instructions are additionally executable by the barcode-reading device processor to send the decoded data to the host computing device via the WLAN connection.

6. The barcode-reading system of claim 3, wherein the remote server comprises at least one data record that associates the barcode-reading device with the host computing device, and wherein the remote server instructions are additionally executable by the remote server processor to:
   receive a barcode image from the barcode-reading device;
   determine, based at least in part on the at least one data record, that the barcode-reading device is associated with the host computing device; and
   send the decoded data corresponding to the barcode image back to the host computing device.

7. The barcode-reading system of claim 6, wherein:
   the remote server instructions are additionally executable by the remote server processor to send a decoding indication to the barcode-reading device; and
   the barcode-reading device instructions are additionally executable by the barcode-reading device processor to generate at least one of a visual output, an audible output, or tactile feedback in response to receiving the decoding indication.

8. The barcode-reading system of claim 1, wherein the barcode-reading device instructions are additionally executable by the barcode-reading device processor to:
   periodically capture sampling images for the purpose of sampling a surrounding environment;

send one or more sampling images to the remote server in response to determining, based at least in part on analyzing the sampling images, that the surrounding environment has changed by a sufficient amount to justify requesting image quality feedback from the remote server;

receive the image quality feedback from the remote server in response to sending the one or more sampling images to the remote server; and change at least one image capture setting based at least in part on the image quality feedback.

9. The barcode-reading system of claim 8, wherein:
the barcode-reading device comprises at least one illumination element; and
the sampling images are captured while the at least one illumination element is not illuminated.

10. The barcode-reading system of claim 8, wherein determining that the surrounding environment has changed by a sufficient amount to justify requesting the image quality feedback from the remote server comprises determining that a current sampling image is different from a previous sampling image by more than a pre-defined amount.

11. A barcode-reading system, comprising:
a barcode-reading device, comprising:
  a communication module that is configured to communicatively couple the barcode-reading device to a host computing device and communicatively couple the barcode-reading device to a remote server;
  a camera that is configured to capture images;
  a barcode-reading device processor;
  barcode-reading device memory communicatively coupled to the barcode-reading device processor; and
  barcode-reading device instructions stored in the barcode-reading device memory and executable by the barcode-reading device processor to cause the images to be sent to the remote server for decoding;
a decoder on the remote server, wherein the decoder is executable by a remote server processor to process the images and attempt to decode any barcodes in the images;
remote server instructions that are executable by the remote server processor to:
  cause decoded data to be sent back to at least one of the host computing device or the barcode-reading device; and
  evaluate quality of the barcode images, generate image quality feedback, and send the image quality feedback to the barcode-reading device;
wherein the barcode-reading device instructions are additionally executable by the barcode-reading device processor to change at least one image capture setting based at least in part on the image quality feedback.

12. A barcode-reading device, comprising:
a communication module that is configured to communicatively couple the barcode-reading device to a host computing device and communicatively couple the barcode-reading device to a remote server;
a camera that is configured to capture images;
a processor;
memory communicatively coupled to the processor; and
instructions stored in the memory and executable by the processor to:
  cause the images to be sent to the remote server for decoding;
  periodically capture sampling images for the purpose of sampling a surrounding environment;
  send one or more sampling images to the remote server in response to determining, based at least in part on analyzing the sampling images, that the surrounding environment has changed by a sufficient amount to justify requesting image quality feedback from the remote server;
  receive the image quality feedback from the remote server in response to sending the one or more sampling images to the remote server; and
  change at least one image capture setting based at least in part on the image quality feedback.

13. The barcode-reading device of claim 12, wherein the instructions are additionally executable by the processor to:
receive decoded data from the remote server; and
send the decoded data to the host computing device.

14. The barcode-reading device of claim 12, wherein the instructions are additionally executable by the processor to:
receive a decoding indication from the remote server; and
generate at least one of a visual output, an audible output, or tactile feedback in response to receiving the decoding indication.

15. The barcode-reading device of claim 12, wherein the instructions are additionally executable by the processor to:
perform at least one preliminary processing operation on an image that is captured by the camera;
determine, based at least in part on results of the at least one processing operation, whether at least one requirement has been satisfied for sending the image to the remote server;
send the image to the remote server when the at least one requirement is satisfied; and
discard the image without sending the image to the remote server when the at least one requirement is not satisfied.

* * * * *